B. LELAND.
LUBRICATING DEVICE.
APPLICATION FILED JUNE 6, 1914.

1,125,135. Patented Jan. 19, 1915.

Witnesses
W. A. Williams
P. A. Blair

Inventor
Brace Leland
By Crowell & Phelps
Attorneys

UNITED STATES PATENT OFFICE.

BRACE LELAND, OF WINONA, MINNESOTA.

LUBRICATING DEVICE.

1,125,135.   Specification of Letters Patent.   Patented Jan. 19, 1915.

Application filed June 6, 1914. Serial No. 843,447.

*To all whom it may concern:*

Be it known that I, BRACE LELAND, a citizen of the United States, residing at Winona, in the county of Winona and State of Minnesota, have invented certain new and useful Improvements in Lubricating Devices, of which the following is a specification.

This invention relates to lubricating devices, and with regard to its more specific features to a reservoir for lubricating reservoirs particularly adapted for use on locomotives and the like.

One of the objects of the present invention is to provide a simple and practical device of the above character which will be cheap to manufacture and install.

Another object is to provide a safety automatic lubricator filler which will be reliable and efficient in use.

Other objects will be in part obvious and in part hereinafter pointed out.

The invention accordingly consists in the features of construction, combination of elements and arrangement of parts which will be exemplified in the device hereinafter described, and the scope of the application of which will be indicated in the following claims.

Figure 1:
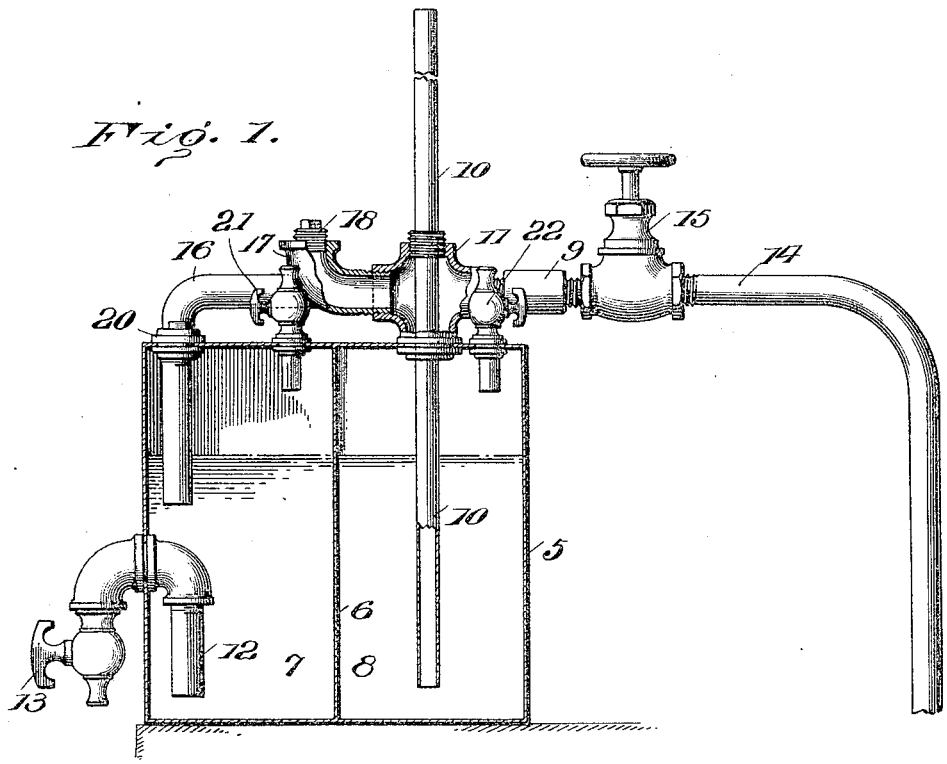
Figure 2:
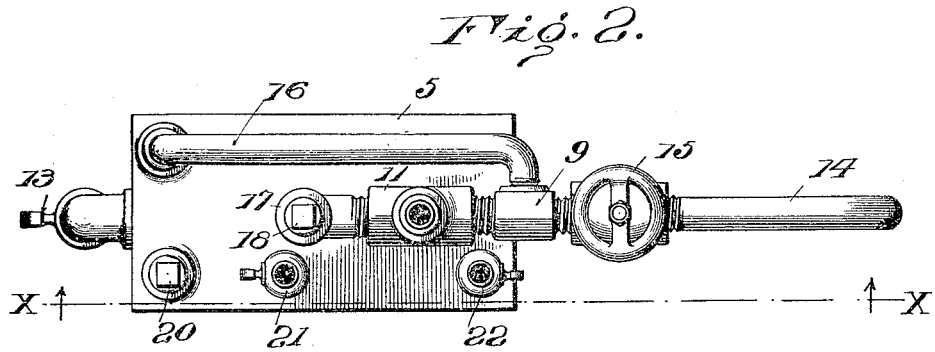

In the accompanying drawing, wherein is illustrated one of various possible embodiments of the present invention, Figure 1 is a vertical sectional elevational view of the complete device taken on the line $x$ $x$, Fig. 2; Fig. 2 represents a plan view of the complete device.

Referring now to the drawing in detail, in which similar reference characters denote corresponding parts, 5 is a receptacle divided by a central partition 6 into two chambers 7 and 8, each of which is adapted to contain oil. The chamber 8 is provided with an outlet pipe 10 dipping down into the bottom of the receptacle and passing out through a connection 11 at the top. The upper part of this pipe 10 is adapted to communicate with the parts to be lubricated. The chamber 7, which is likewise adapted to contain oil or lubricating fluid, is provided with an inverted U-shaped connection 12, dipping down into the bottom of the chamber, and provided on the outside with a stop cock 13, through which the oil may be drawn for filling hand oil cans when lubricating other parts of the machine not directly connected with the chamber 8. The connection 11 is connected at one side with a pipe 14, which in turn is connected with any suitable source of compressed air, as for example the air brake system of the locomotive on which the device might be mounted. A valve 15, located in the pipe 14, controls the supply of air to the tanks or chambers.

In Fig. 2 it will be noted that intermediate the connection 11 and the valve 15 is a T-joint 9 provided with a branch pipe 16 for conveying compressed air to the chamber 7. At the opposite side of the connection 11 is an upwardly turned pipe 17, provided with a filling plug 18, whereby the tank or chamber 8 may be filled, the oil flowing down through the connection 11 between the side walls thereof, and the centrally disposed pipe 10. A filling plug 20 is also provided for the chamber 7. Vent cocks 21 and 22 are provided at the top of each chamber 7 and 8 respectively, for permitting the escape of the compressed air while filling the receptacle.

While the method of use of this device should be clear from the above description, a brief statement thereof is submitted as follows: Both chambers 7 and 8 are filled with a lubricating fluid through the filling plugs 20 and 18 respectively, while the vent cocks 21 and 22 are in open position, as shown in Fig. 1. When the tank is filled the cocks are closed and the valve 15 opened to allow compressed air to enter both chambers. This air will of course force the oil out through the pipe 10 to the part to be lubricated, and when it is desired to fill a portable oil can the same may be conveniently done through the cock 13. It is thus seen that this invention provides a simple and practical device, adapted to accomplish among others all of the objects and advantages above set forth.

A device of this character is especially safe and permits convenient handling of the engine or cylinder oil on locomotives. It eliminates the carrying of several cans and does away with the dangerous operation of taking out the filling plugs when the lubricator is hot.

As many changes could be made in the above construction and many apparently widely different embodiments of my invention could be made, without departing from the scope thereof, I intend that all matter contained in the above description or shown in the accompanying drawing shall be interpreted as illustrative and not in a limiting sense.

Having thus described my invention what I claim as new and desire to secure by Letters Patent is:

1. In a device of the character described, in combination, a casing adapted to contain lubricating fluid, a source of compressed air, an outlet pipe leading from said casing, and a filling inlet pipe surrounding the outlet pipe and connected with the compressed air supply.

2. In a device of the character described, in combination, a casing divided into a plurality of chambers adapted to contain lubricating fluid, a common source of compressed air connected with said chambers, an outlet pipe leading from one chamber, and a filling inlet pipe surrounding the outlet pipe and connected with the compressed air supply.

3. In a device of the character described, in combination, a plurality of chambers adapted to contain lubricating fluid, a single source of compressed air, branch pipes leading therefrom to the several chambers, an outlet through which the lubricating fluid is adapted to be forced passing through one of said branch connections, filling inlets for said chambers, a connection with the lower part of one of said chambers whereby the oil will be forced out automatically by the air pressure, and air vents associated with said chambers permitting the escape of air during the filling of said chambers.

In testimony whereof I affix my signature in presence of two witnesses.

BRACE LELAND.

Witnesses:
D. E. TAWNEY,
A. J. LELAND.

Copies of this patent may be obtained for five cents each, by addressing the "Commissioner of Patents, Washington, D. C."